United States Patent [19]
Polley et al.

[11] Patent Number: 5,868,487
[45] Date of Patent: Feb. 9, 1999

[54] COMPUTER KEYBOARD LIGHT SYSTEM

[75] Inventors: Kent S. Polley; Robert M. Fontaine, both of Broussard, La.

[73] Assignee: Catalina Lighting, Inc., Miami, Fla.

[21] Appl. No.: 863,797

[22] Filed: May 27, 1997

Related U.S. Application Data

[60] Provisional application No. 60/019,101 Jun. 3, 1996.

[51] Int. Cl.$^6$ .................................................. F21V 13/00
[52] U.S. Cl. ............................ 362/33; 362/85; 362/109; 362/183; 362/234
[58] Field of Search ................................ 362/33, 85, 97, 362/109, 234, 253, 418, 427, 183

[56] References Cited

U.S. PATENT DOCUMENTS

| | | | |
|---|---|---|---|
| D. 208,004 | 6/1967 | Heller | D48/20 |
| D. 376,219 | 12/1996 | Heuel | D26/62 |
| 2,524,461 | 10/1950 | McDowell | 362/295 |
| 3,368,067 | 2/1968 | Paxinos | 362/253 |
| 4,414,609 | 11/1983 | Shemitz | 362/33 |
| 4,626,965 | 12/1986 | Gupta et al. | 362/33 |
| 4,760,277 | 7/1988 | Vurpillat | 362/33 |
| 4,922,060 | 5/1990 | McJunkin | 362/33 X |
| 5,034,865 | 7/1991 | Sonneman | 362/226 |
| 5,036,436 | 7/1991 | Rattigan et al. | 362/33 |
| 5,055,977 | 10/1991 | Acquanetta | 362/23 |
| 5,183,325 | 2/1993 | Hurdle | 362/109 |
| 5,203,622 | 4/1993 | Sottile | 362/109 |
| 5,379,201 | 1/1995 | Friedman | 362/191 |
| 5,615,945 | 4/1997 | Tseng | 362/226 |
| 5,669,694 | 9/1997 | Morton, Sr. | 362/33 |

*Primary Examiner*—Stephen F. Husar
*Attorney, Agent, or Firm*—Morey B. Wildes, Esq.; Cowan Liebowitz & Latman, P.C.

[57] ABSTRACT

A computer keyboard light comprises, in a first embodiment, at least one small upright lamp unit mounted to a flat plate that is secured to the underside of the computer keyboard or PC monitor. The lamp arms are telescopeable and are rotatable by rachet connections to allow for adjustment of the lights. The arms could also be formed of an internal structure that allows them to be twisted or adjusted into different shapes and positions. In another embodiment, the computer keyboard light further comprises a small lamp unit mounted to a small rectangular plate that is adhered to the side of the PC monitor in order to illuminate either the keyboard, the monitor screen or a copy holder.

33 Claims, 5 Drawing Sheets

COMPUTER KEYBOARD LIGHT SYSTEM

BACKGROUND OF THE INVENTION

This invention relates to the field of light systems and, more particularly, to the field of lights for personal computer keyboards and other control means.

During recent years, the use of personal computers (PC's) has become prevalent. Personal computers have achieved widespread use both in the home as well as in the office environment—so much so, that even the most cramped of college dormitory rooms is rarely without at least one PC. PC's are also being increasingly found in bedrooms of high school students across the United States. In addition, many small business owners use PC's as a way of converting a part of their living space into a makeshift "home office."

A common problem associated with most non-office users of PC's is the lack of proper lighting for illuminating the PC. Until now, no single light could be used for illuminating the entire PC operation system, including the associated microprocessor, monitor, adjustment knobs, keyboard, writing area, copyholder, etc. For example, a swing arm lamp must have several adjustable lamp heads with different power outputs for illuminating each location. Thus, no traditional desk lamp can fulfill this special purpose.

Another problem in many situations of PC home use is a severe shortage of space, a result of which is the fact that PC users are often faced with cramped workstations. The presence of a large PC, including its associated microprocessor, monitor and computer keyboard, leaves precious little space for other necessary workstation devices, such as a desk lamp. Any traditional desk lamp is too large in size and power to be inserted into a cramped PC workstation. Thus, unfortunately this often leads to the absence of a proper computer and keyboard light needed to enable a PC user to see the PC components properly, thereby exacerbating the common problem of poor lighting discussed earlier. It is desirable to provide a light source that is dedicated to computer keyboard illumination and that will not impose on the space surrounding the PC workstation.

It is, therefore, an object of this invention to provide a light system for illumination of the keyboard and other control means of a home-used personal computer.

It is another object of this invention to provide a PC keyboard light system that will not impose on the space surrounding the PC workstation and will be safe enough in a limited flammable environment.

It is a further object of this invention to provide a PC keyboard light system that may also illuminate a portable PC, a copy holder, a printer and a writing area and that may be powered by 12/24 volt AC, by 12/24 volt DC or by rechargeable batteries.

SUMMARY OF THE INVENTION

In accordance with these and other objects of the invention, a personal computer keyboard light system comprises, in a first embodiment, at least one small upright lamp unit mounted to a flat base that is secured to the underside of the computer keyboard or PC monitor. The lamp arms are telescopeable, and both the lamp arms and the lamp heads are rotatable by rachet connections to allow for adjustment of the lights. The arms could also be formed of an internal structure that allows them to be twisted or adjusted into different shapes and positions.

In another embodiment, the computer keyboard light system further comprises a small lamp unit mounted to a small planar base that is adhered to the side of the PC monitor in order to illuminate either the keyboard, the monitor adjustment knobs, the control means of the printer, the mouse, a writing area or a copy holder. In this embodiment, the lamp head and arms are adjustable as discussed.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which.

DETAILED DESCRIPTION OF THE INVENTION

Figure 1:
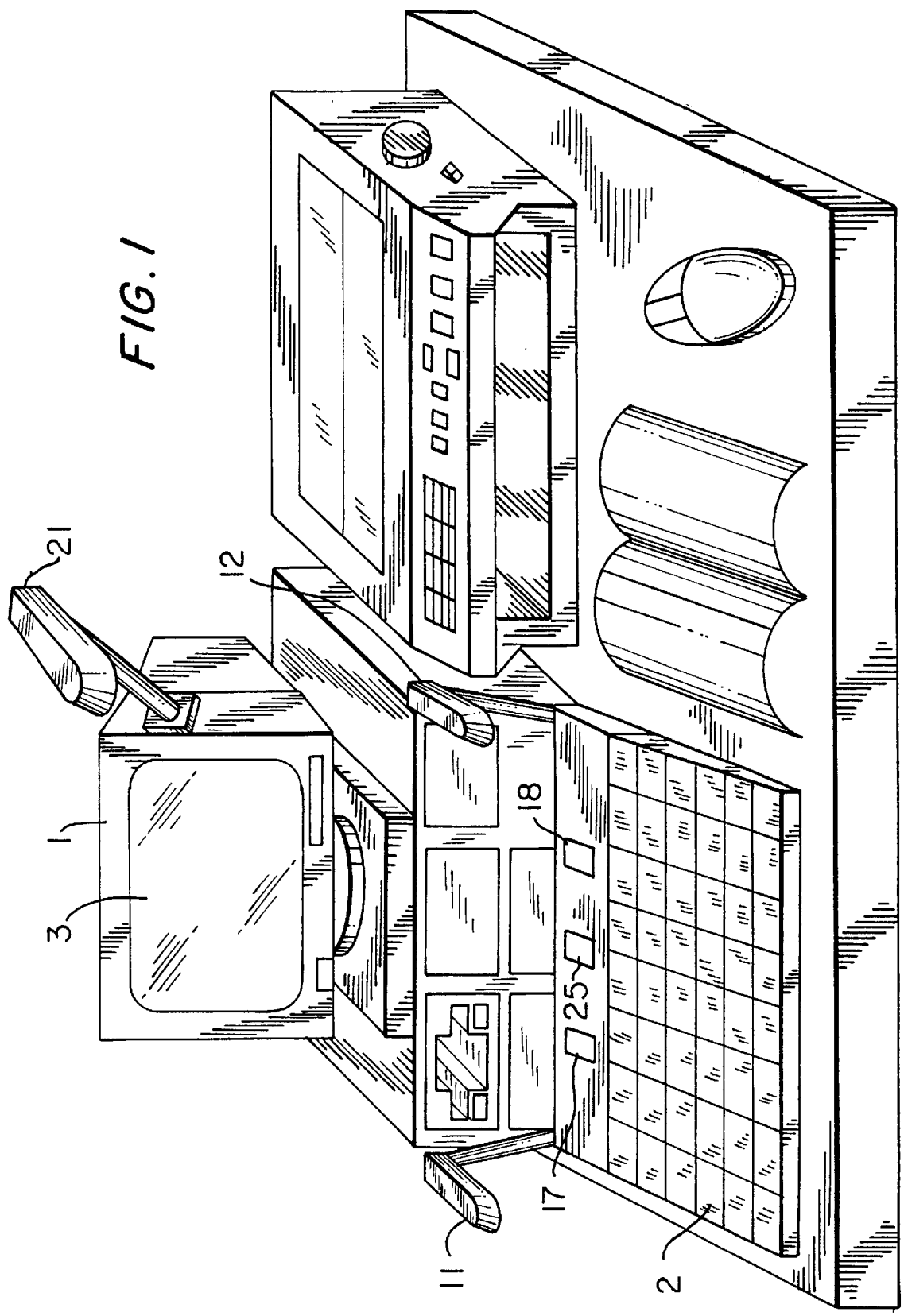
FIG. 1 is a perspective view of a preferred embodiment of this invention in use on a personal computer.

An embodiment of the complete computer keyboard light system of the present invention is shown in FIG. 1. FIG. 1 shows a home-computer set (including a microprocessor, a monitor, a keyboard, a printer and a mouse) on a simple table surface, the area of which surface is generally less than 3 feet by 2 feet. As shown in FIG. 1, all keys/knobs/switches for operating the whole computer system are illuminated by three lamps of this invention. Of course, the monitor screen has enough luminosity for itself if it is not of the liquid-crystal type. A preferred embodiment of this invention comprises two components, shown separately in FIGS. 2 and 3, that function together in a preferred embodiment but may each function independently in respective alternative embodiments.

Figure 2:
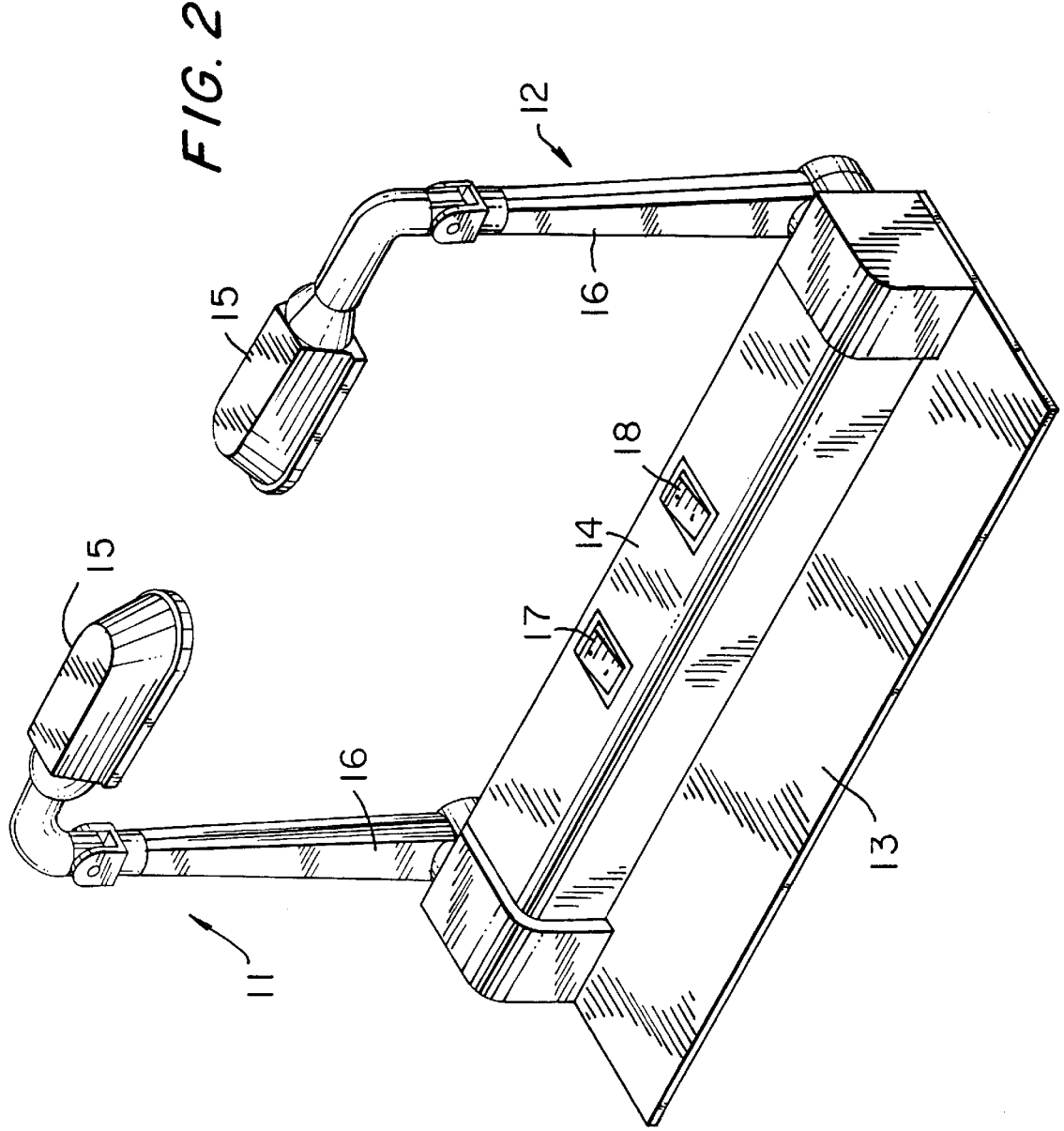
FIG. 2 is a perspective view of a first embodiment of this invention.

As shown in FIGS. 1 and 2, the first component of the preferred embodiment comprises at least one but preferably two lamp units 11,12 mounted to a horizontal planar weighted plate 13 by way of a control panel 14. The control panel 14 is an elongated box that is approximately the same width as keyboard 2 and is preferably approximately 12" to 19" wide. Control panel 14 is mounted at the back edge of keyboard 2, closest to the monitor 1 such that flat plate 13 extends from the front side of control panel 14 under keyboard 2. Lamp units 11,12 are mounted to the back side of control panel 14, closest to monitor 1, as described below. During normal operation of the PC, flat plate 13 is placed under keyboard 2 such that control panel 14 and mounted lamp units 11,12 are mounted along the back edge of keyboard 2. Alternatively, plate 13 may also be secured to the underside of keyboard 2. Each lamp unit 11,12 comprises a lamp head 15, containing a bulb covered by a light cover, and an arm 16 to enable the bulb to shine onto keyboard 2 from a distance above keyboard 2. Thus, the light from the lamp units 11,12 shines downward onto keyboard 2 from the side of keyboard 2 opposite the user.

The lamp units 11,12 are rotatably mounted to the back edge of control panel 14 so that the lamp arms 16 may be angled forward or backward relative to keyboard 2 about a horizontal axis parallel to the direction of the width of keyboard 2 in order to vary angle α and provide the light most desirable to the user. Each lamp arm 16 may also be turned left or right about its own axis in order to vary angle β and change the illumination target of the lamp unit 11,12. Alternatively, lamp arms 16 may be mounted in a ball-and-socket type joint so that they may be moved in all directions about the mounting point in order to provide the user even more ability to shine the light at the most desirable angle or direction. Lamp arms 16 may also be telescopeable in order to shorten or lengthen lamp arms 16 to bring the light in lamp head 15 closer to or farther from keyboard 2.

In addition, in order to give the user further options in illumination of keyboard 2, the angle γ between the lamp head 15 and the arm 16 on each lamp unit 11,12 may be varied about a horizontal axis. The combination of rotation of lamp head 15 with the rotation and telescoping of lamp arm 16 will enable the lamp unit to illuminate all parts of keyboard 2, PC monitor screen 3 or nearby writing or copyholder areas.

The control panel 14 is an extended box that incorporates within it the electrical circuitry for the lamp units 11,12. The control panel 14 will house rechargeable batteries and diodes, in case the user desires that the lights run on battery power. The control panel also contains, on its top surface visible to the user, an on/off switch 17,18 for each lamp unit 11,12. If desired, a dimmer switch may also be included.

As illustrated in FIG. 1, in the first component of the computer keyboard light system, control panel 14 is placed at the back edge of keyboard 2. In addition, flat plate 13 may be removably secured to the underside of keyboard 2 by any known attachment means, such as screws, latches, velcro or the like. Plate 13 is placed under or secured to the underside of keyboard 2 such that the two lamp units 11,12 are situated on either side of the PC monitor 1. This way, if the user desires, the lights could be shined at the PC monitor screen 3 as well as at the keyboard 2 or any neighboring regions.

In a preferred embodiment, lamp head 15, lamp arms 16 and control panel 14 of this first component should be appropriately sized relative to each other and relative to computer monitor 1 and keyboard 2 so that an object of the invention, namely, providing a PC keyboard light that will not impose on the space surrounding the PC workstation, will not be defeated. In addition, the relative sizes and lengths of the parts should be in proportions such that the components of this device do not appear awkward when used together and so that they are well-balanced and do not have a propensity to topple. To this end, it is preferred that the length of lamp unit head 15 be between about 33% and about 100% of the length of arm 16 in its non-telescoped position. The length of lamp unit head 15 should also preferably be between about 20% to about 45% of the width of control panel 14. Arm 16 of lamp units 11,12, in its non-telescoped position, should preferably be between about 33% to about 75% of the width of control panel 14.

In these measurements, lamp unit head 15 and arms 16 are small enough so as not to be obtrusive to the user of a PC. They are also not too large relative to control panel 14 (and attached keyboard 2) so as to cause the device to topple over when the balance is upset by a widely-angled lamp unit 11,12.

Figure 4:
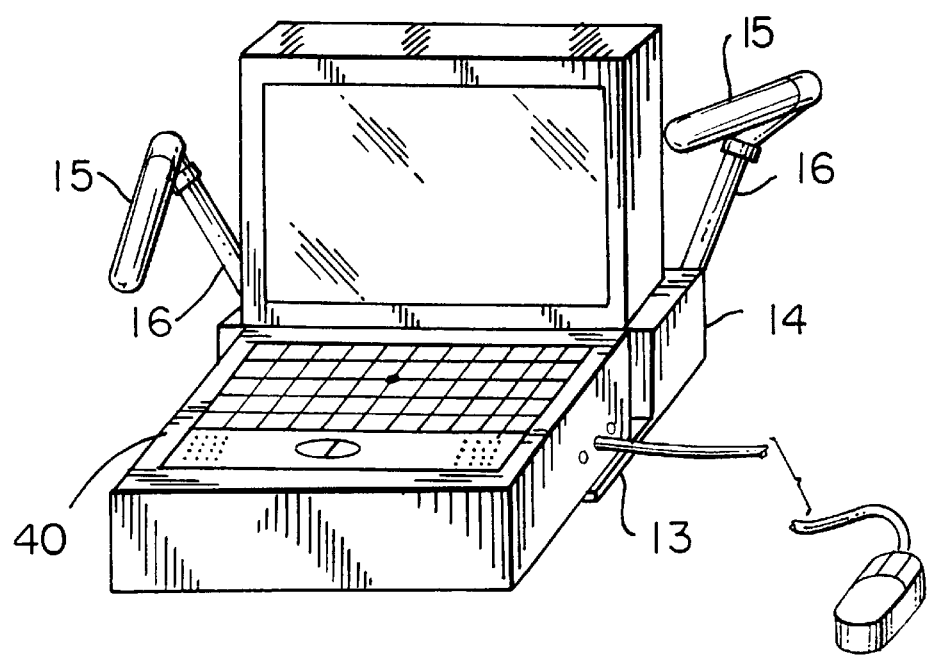
FIG. 4 shows use of the first embodiment of this invention with a portable computer.

This first embodiment of the invention can also be used with a portable PC, as shown in FIG. 4, in addition to the desktop setup of FIG. 1. In this use, control panel 14 is placed behind portable PC 40 such that plate 13 is placed under or secured to the underside of portable PC 40. Lamp arms 16 are then pivoted forward so that light from lamp heads 15 will illuminate keyboard 41 of portable PC 40.

Figure 3:
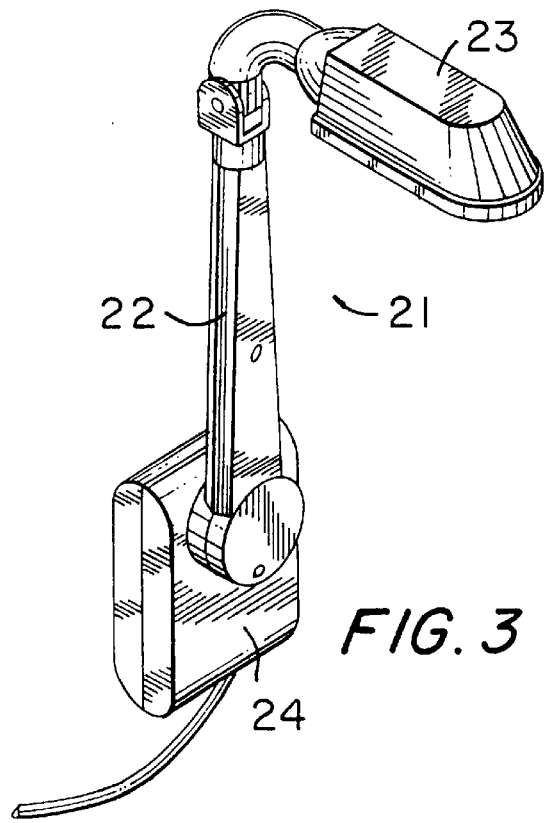
FIG. 3 is a perspective view of an alternative embodiment of this invention.

The preferred embodiment of the computer keyboard lights of the present invention further comprises a second component, as shown in FIGS. 1 and 3. This second component comprises one lamp unit 21, having an arm 22, which may be telescopeable, and a lamp head 23 as discussed previously, that is rotatably mounted to a small, vertical, planar plate 24. During normal operation of the PC, vertical plate 24 is secured to the side of PC monitor 1 by any known means, such as glue or other adhesive, or any other means such that, during operation, plate 24 is set with respect to monitor 1. In this position, unit 21 is rotatably mounted to the PC monitor 1 in order to vary angle θ. Thus, lamp arm 22 may be rotated forward or backward about a horizontal axis perpendicular to the side of the PC monitor 1 in order to vary angle θ. Lamp arm 22 may also be turned left or right about its own axis in order to vary angle σ. Furthermore, lamp head 23 may be turned up or down relative to lamp arm 22 about a horizontal axis perpendicular to lamp arm 22 in order to vary angle φ. The combination of this lamp head 23 movement with the two possible lamp arm 22 rotations and the lamp arm 22 telescoping action will enable the lamp unit 21 to provide additional illumination for all parts of the keyboard 2 or PC monitor screen 3. This second component lamp unit 21 will be especially useful, however, in providing illumination for a writing area or a copy holder alongside the monitor.

As with the elements of the first component of the preferred embodiment, the elements of the second component, namely lamp arm 22 and lamp head 23, should be appropriately sized relative to each other and relative to computer monitor 1, and keyboard 2. In this way, the lamp arm 22 and head 23 will not be obtrusive to the user and will not be so large as to cause the device and its plate 23 to detach from the side of PC monitor 1. To this end, it is preferable that the length of the lamp unit head 23 be approximately between about 33% and about 100% of the length of arm 22. Similarly, the length of head 23 should preferably be approximately between about 25% to about 50% of the width of control panel 14, and arm 22, in its non-telescoped position, should preferably be approximately between about 40% to about 85% of the width of control panel 14.

When the two components are used together in the preferred embodiment, control panel 14 incorporates within it the circuitry for the monitor lamp unit 21 of the second component as well as for the keyboard lamp units 11,12 of the first component. Thus, any necessary wiring will extend from control panel 14 to the monitor lamp unit 21. Of course, control panel 14 will also comprise on its top surface an on/off switch 25 for the monitor lamp unit 21, in addition to the on/off switches 17,18 for the keyboard lamp units 11,12. Similarly, a dimmer switch (not shown) may also be included. Switches 17, 18 and 25 are all common on/off switches with common, simple circuitries. The electricity used is SELV (safety extra low voltage), i.e., under 50V.

Figure 5:
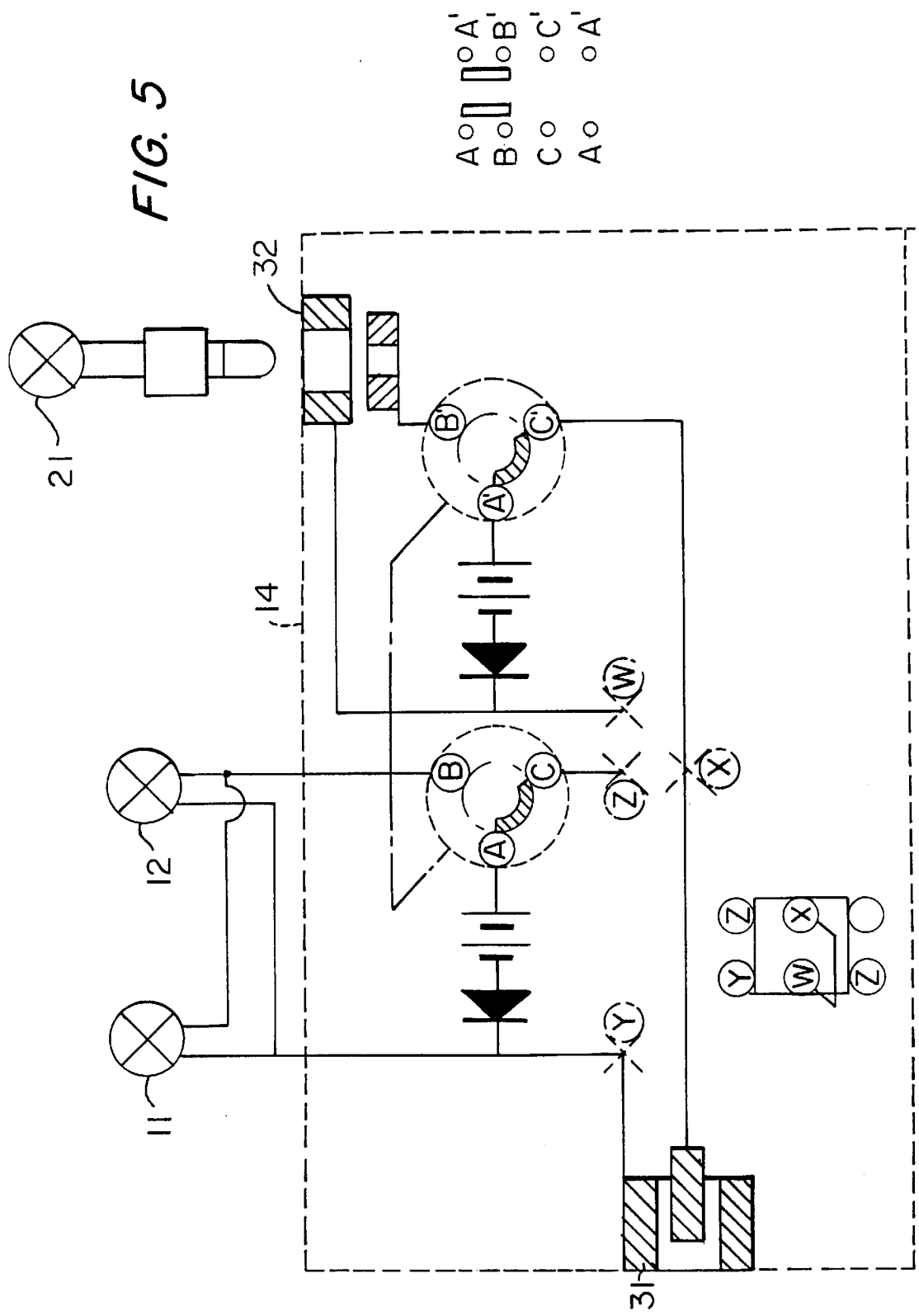
FIG. 5 is a typical circuit diagram of this invention.

FIG. 5 shows a preferred circuit diagram of this invention. In FIG. 5, lamps 11,12,21 are shown. Lamps 11 and 12 are connected in parallel, and each uses a 12V, 4W bulb. Lamp 21 uses a 12V, 8W bulb. However, other bulbs may be used, for example, two 12V, 5W bulbs, and one 12V, 10W bulb for a 12V, 20W output adaptor can also be used. SW3 is a double-pole, double-throw switch and is used for selecting the input AC/DC voltage. For example, when in the W-Y/X-Z position, the input voltage of male-socket 31 is 12V (AC or DC). In this position, lamps 11,12 are parallel-connected with lamp 21, since 12V AC is widely used by common lighting for halogen bulbs and 12V DC is now widely used in mocars. While in the W-Z position, the input voltage of the male-socket 31 is 24V (AC or DC). In this position, lamps 11,12 are connected in series with lamp 21, since 24V DC is widely used in mocars too.

In fact, the power consumption of lamps 11,12 and lamp 21 are equal (4W+4W=8W). In FIG. 5, two sets of rechargeable batteries (12V) with a diode are parallel-connected to said lamp groups. These diodes are used for AC conditions. When male-socket 31 is supplied with DC current, all diodes will not act. When male-socket 31 is supplied with AC current, all diodes unintended half wave.

SW1/SW2 is a two-contactor, three-position switch used to select the charge (also lamp off) mode, the battery-power mode and the external-power mode. When two contactors connect A and B, all lamps are powered by an internal power source, preferably batteries, and even more preferably rechargeable batteries. When two contactors connect A and C, all internal batteries are charged by an external supply. When two contactors connect B and C, all lamps are powered by an external supply. Of course, SW1 and SW2 may be rotary switches or sliding switches. The circuit diagram for said sliding switches is also shown in FIG. 5.

Figure 6:
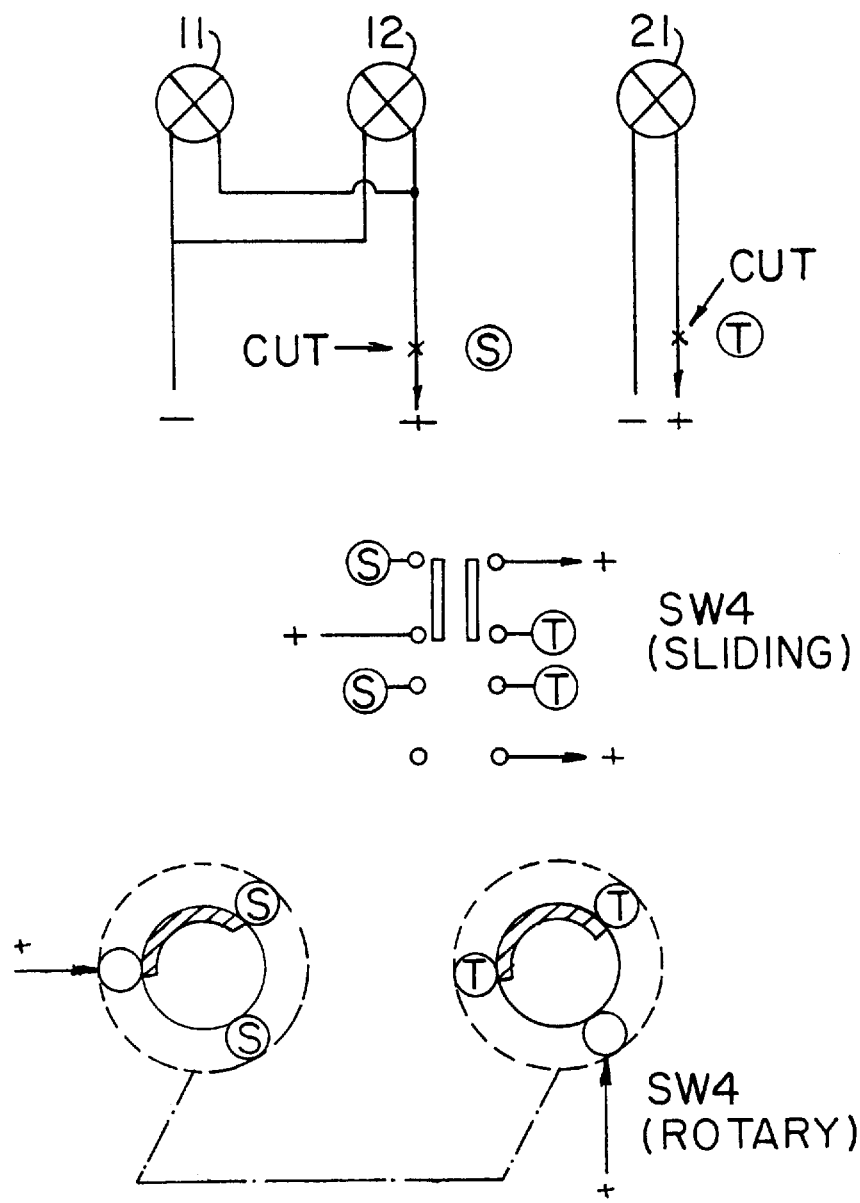
FIG. 6 is a circuit diagram of another embodiment of the invention.

When this preferred circuitry is used, the switches 17, 18 and 25 of the old embodiment can be replaced by SW1/SW2, SW3 and SW4, there still being three switches on the control panel 14. For example, switch 17 is replaced by SW3, switch 25 is replaced by SW1/SW2, and switch 18 is replaced by SW4. SW4 is identical to SW1/SW2 except that 2×4 terminals are used. Referring to FIG. 6, SW4 may be of a sliding type or may be of a rotary type. The wiring can simply be cut at locations S and T and connect the four terminals caused by said cut as shown. Now, all three bulbs are in two groups. Referring to the sliding type of SW4 in FIG. 6, when two parallel contactors are in their up-most position, all lamp groups will be ON. When two contactors are in their middle position, only the left group (including lamp 11 and lamp 12) will be ON. When two contactors are in their low position, only the right group (lamp 21) will be ON. Of course, since the above mentioned SW4 only has three positions, lamps 11 and 12 are ON/OFF simultaneously. If a five-position SW4 is used, all lamps (11, 12 and 21) can be ON/OFF separately.

According to IEC Standards, lamp 21 usually has a male plug 33 for matching the female socket 32 which is installed on control panel 14. Any external supply also has the form of a female plug (not shown) to match male-socket 31 which is also installed on the control panel 14. All things inside the dotted lines on FIG. 4 are installed inside/on the control panel 14. In this preferred embodiment, an adaptor of 120V AC input and 12V AC output is used to supply 12V AC to male socket 31 by means of a female-plug. Since this type of adaptor is widely used in the lighting field, it is very easily and cheaply purchased.

Thus, a computer keyboard light system is provided. One skilled in the art will appreciate that the present invention can be practiced by other than the described embodiments, which are presented for purposes of illustration and not limitation, and the present invention is limited only by the claims that follow.

What is claimed is:

1. A computer keyboard light system for use with a personal computer having at least a monitor and a keyboard, comprising:
   a substantially horizontally oriented plate for attachment to said keyboard;
   an elongated control panel mounted along one edge of said plate; and
   at least one lamp unit rotatably mounted to and electrically coupled to said control panel, said at least one lamp unit having a lamp arm rotatably mounted to said control panel at a proximal end of said lamp arm and having a lamp head rotatably attached to a distal end of said lamp arm,
   whereby said lamp unit can be rotated about said control panel and said lamp head can be rotated about said lamp arm to illuminate said keyboard.

2. The computer keyboard light of claim 1 wherein said plate comprises an elongated, horizontally-planar member that extends in a forward direction from said control panel and is secured under said keyboard such that said control panel is positioned behind said keyboard.

3. The computer keyboard light of claim 1 wherein said control panel comprises rotatable mounting means for allowing said lamp unit to rotate within said rotatable mounting means.

4. The computer keyboard light of claim 3 wherein said rotatable mounting means comprises a hinge means for enabling said lamp unit to rotate about an axis parallel to the elongated direction of said control panel.

5. The computer keyboard light of claim 3 wherein said rotatable mounting means comprises a ball-and-socket joint.

6. The computer keyboard light of claim 1 wherein said lamp arm is telescoping to allow it to be extended in the direction of said arm.

7. The computer keyboard light of claim 1 wherein said lamp arm can be bent or twisted in a transverse direction.

8. The computer keyboard light of claim 1 wherein said lamp unit further comprises rotatable mounting means for allowing said lamp head to rotate about said distal end of said lamp arm.

9. The computer keyboard light of claim 8 wherein said rotatable mounting means comprises a hinge means to enable said lamp head to rotate about an axis perpendicular to said lamp arm.

10. The computer keyboard light of claim 1 wherein said lamp unit further comprises means for allowing said lamp head to rotate about an axis parallel to said lamp arm.

11. The computer keyboard light of claim 1 wherein said lamp head further comprises a light bulb, said control panel comprises power supply means for providing current to said light bulb and switch means for selectively allowing current to flow to said light bulb for illumination thereof.

12. The computer keyboard light of claim 1 wherein the length of said lamp head is between about 33% and about 100% of the length of said lamp arm.

13. The computer keyboard light of claim 1 wherein the length of said lamp head is between about 20% and about 45% of the width of said control panel.

14. The computer keyboard light of claim 1 wherein the length of said lamp arm is between about 33% and about 75% of the width of said control panel.

15. The computer keyboard light of claim 1 further comprising:
   a substantially vertically oriented plate for attachment to said monitor; and
   at least one monitor lamp unit rotatably mounted to said monitor plate and electrically coupled to said control panel, said lamp unit having a monitor lamp arm rotatably mounted at a proximal end to said monitor plate and having a monitor lamp head rotatably attached to a distal end of said monitor lamp arm,
   whereby said monitor lamp unit can be rotated about said monitor plate and said monitor lamp head can be rotated about said monitor lamp arm to illuminate said keyboard, said monitor or any nearby regions.

16. The computer keyboard light of claim 15 wherein said monitor plate comprises a vertically-planar member affixed to said computer monitor.

17. The computer keyboard light of claim 15 wherein said monitor plate comprises rotatable mounting means for allowing said monitor lamp unit to rotate about an axis perpendicular to said monitor plate.

18. The computer keyboard light of claim 15 wherein said monitor lamp arm is telescoping to allow it to be extended in the direction of said monitor lamp arm.

19. The computer keyboard light of claim 15 wherein said monitor lamp arm can be bent or twisted in a transverse direction.

20. The computer keyboard light of claim 15 wherein said monitor lamp unit further comprises rotatable mounting means for allowing said monitor lamp head to rotate about said distal end of said monitor lamp arm.

21. The computer keyboard light of claim 20 wherein said rotatable mounting means comprises a hinge means to enable said monitor lamp head to rotate about an axis perpendicular to said monitor lamp arm.

22. The computer keyboard light of claim 15 wherein said monitor lamp unit further comprises means for allowing said monitor lamp head to rotate about an axis parallel to said monitor lamp arm.

23. The computer keyboard light of claim 15 wherein said monitor lamp head further comprises a light bulb, said control panel comprises power supply means for providing current to said light bulb and switch means for selectively allowing current to flow to said light bulb for illumination thereof.

24. The computer keyboard light of claim 15 wherein the length of said monitor lamp head is between about 33% and about 100% of the length of said monitor lamp arm.

25. The computer keyboard light of claim 15 wherein the length of said monitor lamp head is between about 25% and about 50% of the width of said control panel.

26. The computer keyboard light of claim 15 wherein the light of said monitor lamp arm is between about 40% and about 85% of the width of said control panel.

27. The computer keyboard light of claim 1 wherein said control panel comprises electrical circuitry and a connection to a power source.

28. The computer keyboard light of claim 27 wherein said control panel comprises an internal rechargeable power source.

29. The computer keyboard light of claim 27 wherein said electrical circuitry comprises means for selectively receiving an external power supply of either 12 or 24 volt, either AC or DC.

30. The computer keyboard light of claim 29 wherein said external power supply comprises a 120V AC/12V AC common adaptor.

31. The computer keyboard light of claim 29 wherein said external power supply comprises a common 12V DC mocar cell.

32. The computer keyboard light of claim 29 wherein said external power supply comprises a common 24V DC mocar cell.

33. The computer keyboard light of claim 1 wherein said control panel comprises adaptor means for electrically coupling thereto at least one additional lamp unit.

* * * * *